(12) United States Patent
Calmeise et al.

(10) Patent No.: US 6,827,357 B2
(45) Date of Patent: Dec. 7, 2004

(54) JANITORIAL CART

(75) Inventors: Randall W. Calmeise, Akron, OH (US); Douglas S. Hardesty, Barberton, OH (US)

(73) Assignee: Akro-Mils, a division of Myers Industries Company, Akron, OH (US)

( * ) Notice: Subject to any disclaimer, the term of this patent is extended or adjusted under 35 U.S.C. 154(b) by 23 days.

(21) Appl. No.: 10/068,539

(22) Filed: Feb. 6, 2002

(65) Prior Publication Data

US 2002/0109318 A1 Aug. 15, 2002

Related U.S. Application Data

(60) Provisional application No. 60/267,738, filed on Feb. 9, 2001.

(51) Int. Cl.$^7$ .................................................. B62B 3/00
(52) U.S. Cl. .......................... 280/47.34; 280/47.35; 280/79.2; 280/79.3
(58) Field of Search .................... 280/47.35, 47.26, 280/47.28, 47.34, 47.18, 47.19, 47.17, 47.24, 47.23, 79.3, 79.2, 47.27, 651, 659, 33.992, 129, 98; 220/810; 224/400, 409, 411, 482; D34/11, 12, 14, 21; 248/129, 98

(56) References Cited

U.S. PATENT DOCUMENTS

| | | | |
|---|---|---|---|
| 808,739 A | | 1/1906 | Focht |
| 1,168,008 A | * | 1/1916 | Kleine .................... 280/47.16 |
| 1,176,978 A | * | 3/1916 | Parker .................... 280/47.35 |
| 1,760,854 A | * | 5/1930 | Wright ........................ 296/22 |
| D158,876 S | * | 6/1950 | Lowell ........................ D34/18 |
| D182,716 S | | 5/1958 | Ferguson |
| 2,865,647 A | * | 12/1958 | Wilson .................... 280/47.35 |
| 2,905,480 A | | 9/1959 | Giovannelli |
| 3,573,879 A | | 4/1971 | Bergkamp et al. |
| 4,165,088 A | | 8/1979 | Nelson |

(List continued on next page.)

FOREIGN PATENT DOCUMENTS

| | | | | |
|---|---|---|---|---|
| WO | WO 91/05720 | * | 5/1991 | ............. B65F/1/08 |

OTHER PUBLICATIONS

Rubbermaid Commercial Products–Sanitary Maintenance Section; Flexi 2000 Cleaning Cart; http://web.archive.org/web/20010423001755/www.rubbermaidcommercial.com/action.lasso!–Response=smpage.lasso&RCPNOsearch=6182–00.

Bar An Tube Truck From Global Equipment Co. Catalog, p. 86 On Sale at Least as Early 95 Feb. 1, 2000.

Geerpress Housekeeping Cart, Model Escort RX, on Sale at Least as Early as Feb. 1, 2000.

Geerpress Houskeeping Cart, Model Escort, on Sale at Least as Early as Feb. 1, 2000.

Narrow Aisle Platform Truck from Global Equipment Co., p. 102, on Sale at Least as Early as Feb. 1, 2000.

Rubbermaid Housekeeping Cart, Model No. 6172–88, on Sale at Least as Early as Feb. 1, 2000.

Ribbermaid Janitor Carts, Model Nos. 6173–02, 6173, on Sale at Least as Early as Feb. 1, 2000.

*Primary Examiner*—Christopher P. Ellis
*Assistant Examiner*—J. Allen Shriver
(74) *Attorney, Agent, or Firm*—Hahn Loeser & Parks LLP; Michael H. Minns

(57) ABSTRACT

A janitorial cart having zone separation to separate storage areas from water zones to help maintain clean and dry storage areas. Basically, a central trash unit separates the water zone from the supply storage zone. Additionally, an enclosed trash compartment is used to conceal a trash collection bag and improved the appearance of the janitorial cart when being used. The enclosed trash compartment is positioned above a pair of large central wheels for improved stability.

25 Claims, 13 Drawing Sheets

U.S. PATENT DOCUMENTS

| | | | | |
|---|---|---|---|---|
| 4,743,040 A | * | 5/1988 | Breveglieri et al. | 280/47.35 |
| D302,064 S | | 7/1989 | Delmerico | |
| 4,869,518 A | | 9/1989 | Breveglierij et al. | |
| 4,923,202 A | * | 5/1990 | Breveglieri et al. | 280/47.35 |
| 5,074,571 A | | 12/1991 | Reese | |
| 5,244,220 A | | 9/1993 | Cortez | |
| 5,326,117 A | * | 7/1994 | Cook | 280/79.2 |
| 5,380,033 A | | 1/1995 | Harling | |
| D361,188 S | | 8/1995 | Perelli | |
| 5,458,350 A | * | 10/1995 | Johnson et al. | 280/47.26 |
| 5,671,933 A | | 9/1997 | Tucker | |
| D395,108 S | | 6/1998 | Pool | |
| 5,765,842 A | * | 6/1998 | Phaneuf et al. | 280/47.35 |
| 5,799,958 A | | 9/1998 | Bishop | |
| 5,881,891 A | | 3/1999 | Murphy, Jr. | |
| 5,913,528 A | * | 6/1999 | Kresse et al. | 280/47.35 |
| D415,867 S | | 10/1999 | Perelli | |
| 6,036,203 A | | 3/2000 | Tyus et al. | |
| D425,279 S | | 5/2000 | Houry et al. | |
| 6,138,558 A | | 10/2000 | Harrington | |
| 6,203,036 B1 | * | 3/2001 | LaVaute et al. | 280/79.3 |
| D460,236 S | | 7/2002 | Perelli et al. | |
| 6,497,423 B1 | * | 12/2002 | Perelli et al. | 280/47.34 |
| D474,570 S | * | 5/2003 | Presnell et al. | D34/21 |
| 2001/0052681 A1 | * | 12/2001 | Deavila | 280/47.19 |
| 2002/0056967 A1 | * | 5/2002 | Carrillo | 280/47.35 |
| 2003/0025303 A1 | | 2/2003 | Perelli et al. | |
| 2003/0122331 A1 | * | 7/2003 | DiGlacomo, Jr. et al. | 280/47.35 |

* cited by examiner

JANITORIAL CART

This application claims the benefit of provisional application Ser. No. 60/267,738, filed Feb. 9, 2001.

BACKGROUND OF THE INVENTION

This invention relates generally to janitorial carts and in particular to wheeled, manually propelled janitorial carts where the cart can efficiently store and organize all the necessary implements for normal cleaning duties.

In typical prior art janitorial carts, the cart includes a mop bucket tray, usually the front portion of the cart, a central storage area for holding paper supplies, cleaning products and tools and a trash collection bag, usually hanging from a combination bag support and cart handle. One such cart is shown in U.S. Pat. No. 4,923,202 by Breveglieri et al. The combined trash bag support and handle can be a problem in that the cleaner's hands are inserted into the trash bag when pushing the cart. This can cause cross-contamination from the trash to the surfaces the cleaner is cleaning. By allowing the trash bag to hang freely from the rear of the cart, the cart can become unstable as the trash bag is filled, the bag itself can fail by tearing or ripping open due to the unsupported weight of the trash within the bag. A further problem that can happen is contamination of the paper goods due to the paper goods being stored on open shelving adjacent the mop bucket tray. Either when a mop bucket containing water is placed on the cart or when the cart is being moved, water in the bucket can spill out and damage the paper goods on the storage shelves.

It has been a goal of prior art cleaning carts to produce a cleaning cart that efficiently and conveniently will hold in a readily accessible position all implements or tools required in a cleaning person's job. However, because of the varying natures in the cleaning job environment, the cart must be flexible enough to be readily adapted to a particular job environment. Typically prior art cleaning carts either do not efficiently use cart space, or in the alternative do not provide sufficient cart space for all the required cleaning utensils. These carts also are inflexible and cannot usually be customized to the particular needs of the cleaning person.

The foregoing illustrates limitations known to exist in present janitorial carts. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a manually propelled janitorial cart having a base with a pair of central wheels and at least one outboard wheel. A central trash compartment is normally positioned above the axis of the central wheels. In an alternate embodiment, the janitorial cart can be provided with three zone separation compartments, a wet zone, a goods storage zone and a trash zone positioned between the wet zone and the goods storage zone. Also, in an alternate embodiment, the trash compartment can be enclosed and include a side access door. It is preferred that a handle be provided that is separate and distal to the trash storage compartment.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
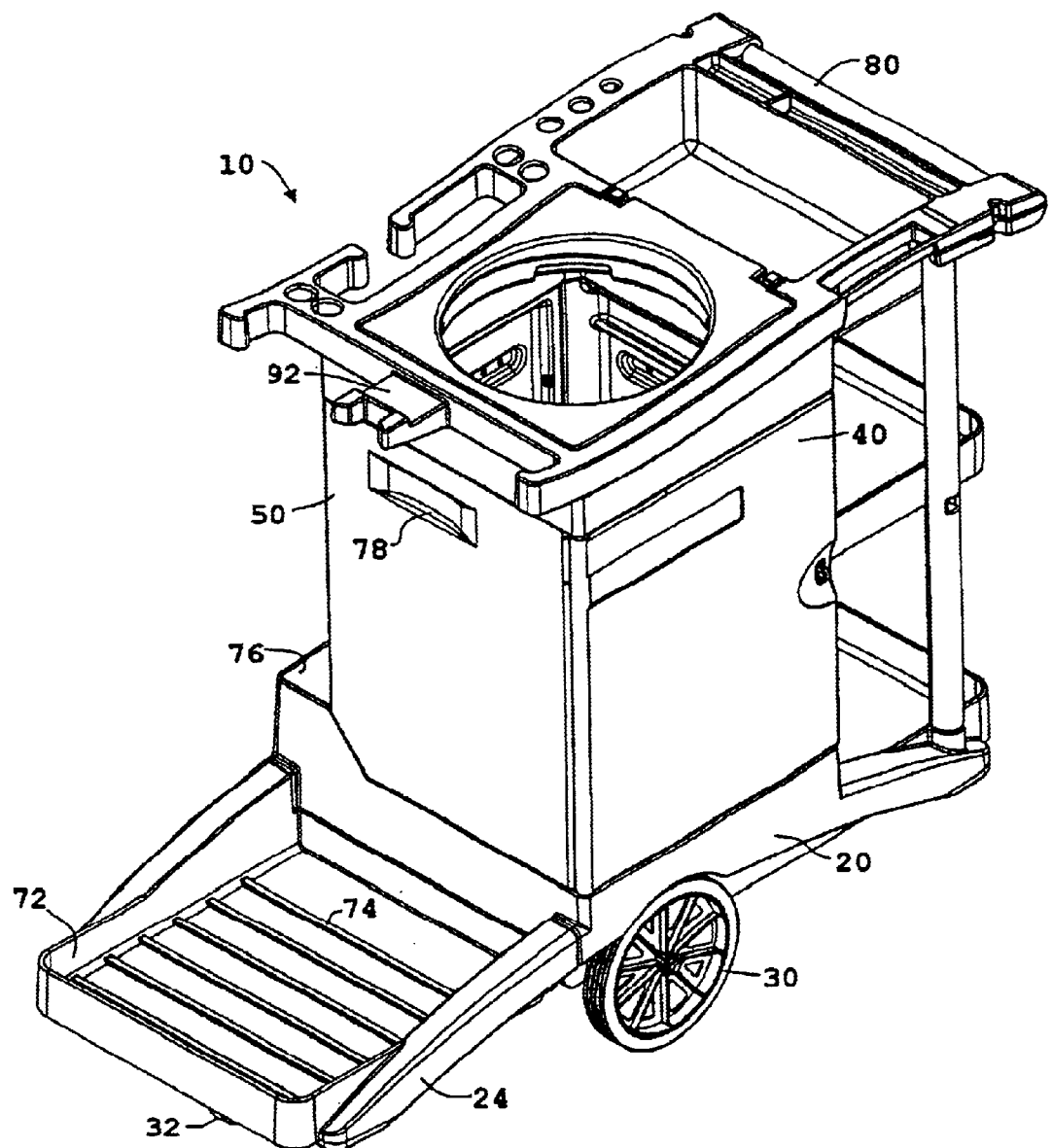
FIG. 1 is a first perspective view of a janitorial cart.

Shown in the FIGURES is a janitorial cart 10 according to the present invention. Two large central wheels 30 are attached to the base 20, approximately in the center of the base 20. A plurality of outboard wheels 32 are attached to the base 20 outboard (along a longitudinal direction) from the central wheels 30. Preferably, the central wheels 30 are larger than the outboard wheels 32. Attached to the base 20 is a central trash compartment 25 that is positioned above the axis of the central wheels 30. The central wheels 30 are removably attached, using cotter pins, to an axle 22.

Figure 4:
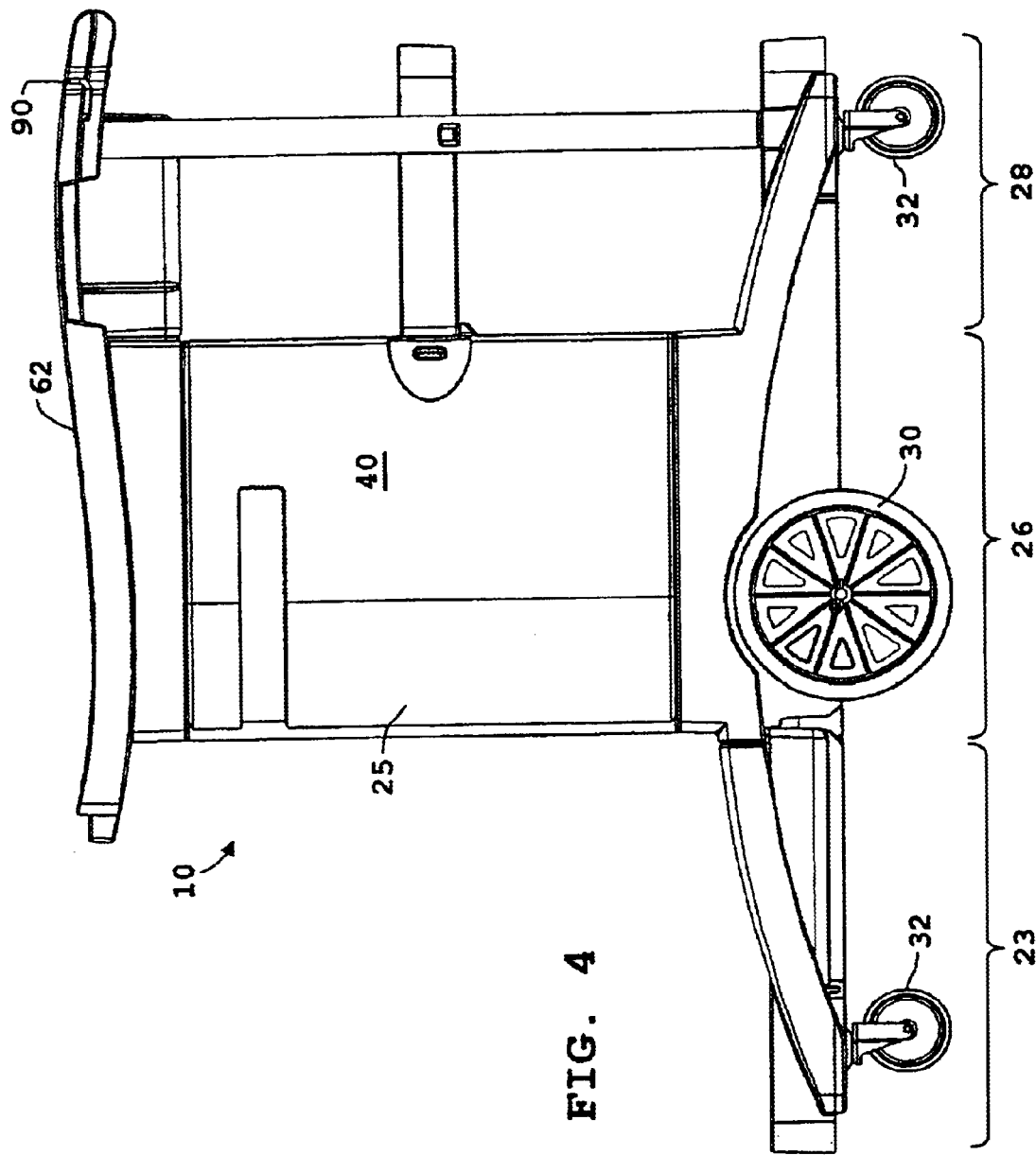
FIG. 4 is a right side view of the janitorial cart shown in FIG. 1.

As shown in FIG. 4, the janitorial cart 10 can be divided into three laterally spaced separation zones, a wet zone 23 in the front of the cart 10, a goods storage zone 28 (the wet zone 23 and goods storage zone 28 also being outboard compartments) and a central trash holding zone 26 positioned between and separating the wet zone 23 from the goods storage zone 28. Preferably, this zone separation also includes a vertical barrier, such as the trash compartment front and rear 50, 52. The wet zone 23 is intended to hold wet items such as a mop bucket containing water and a wet mop. The goods storage zone 28 is intended to hold cleaning items, such as cleaning sprays and consumables, such as paper towel, paper rolls, tissue paper and toilet paper. By separating the wet zone 23 from the goods storage zone 28 by distance, a vertical barrier, a trash storage area or an enclosed trash storage compartment, the possibility of damage to the paper goods from being wetted by water or being contaminated by dirty water is, reduced.

The wet zone 23 is primarily configured to hold a mop bucket in a mop bucket tray 24. As such, it includes a water retaining curb 72 to retain any spilled water and a bucket retaining surface, such as ribs 74, to hold the mop bucket in place while the janitorial cart 10 is being moved. In addition, the top of the trash storage compartment 25 has a signage holder 92 for holding a plurality of caution signs, such as "Caution, Wet Floor." A mop holder recess 96 is provided in a front portion of the signage holder 92 for holding the handle of a mop that has been placed in the mop bucket. The mop bucket tray 24, can alternatively, hold a separate trash container in place of the mop bucket. To accommodate large trash containers, such as a 32 gallon Brute® waste container by Rubbermaid, an aperture or recess 78 is provided in the front 50 of the trash storage compartment 25.

Figure 5:
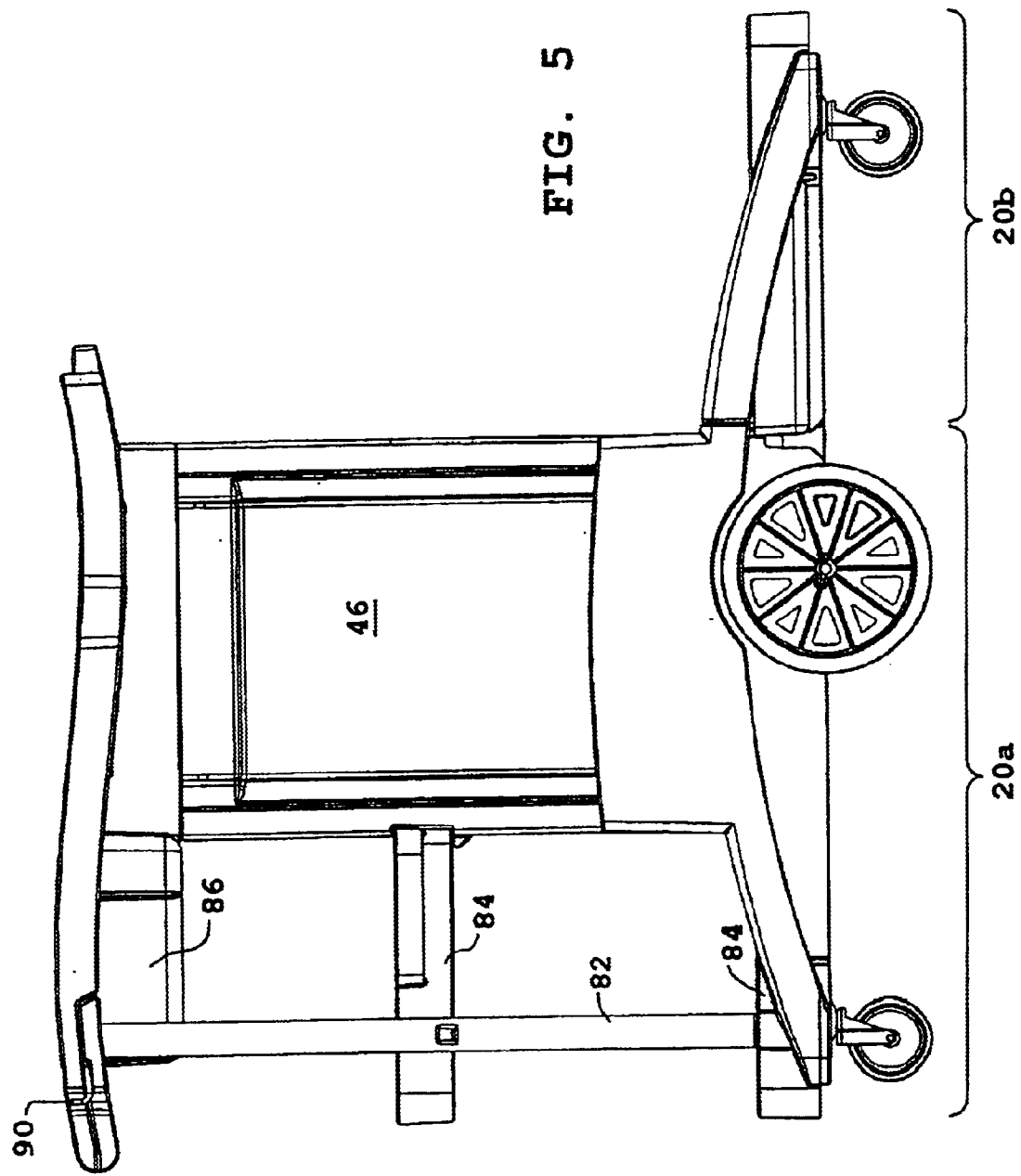
FIG. 5 is a left side view of the janitorial cart shown in FIG. 1.
Figure 6:
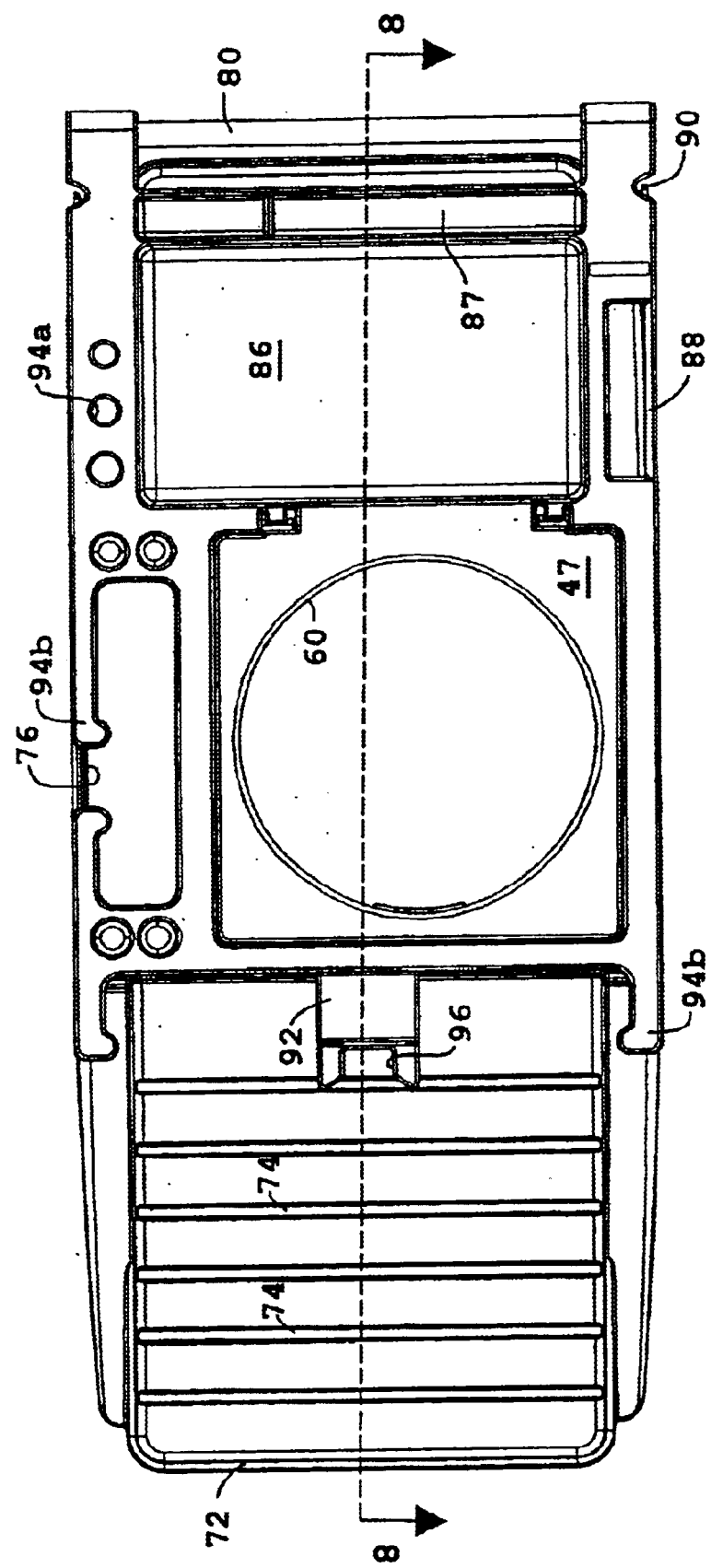
FIG. 6 is a top view of the janitorial cart shown in FIG. 1.
Figure 7:
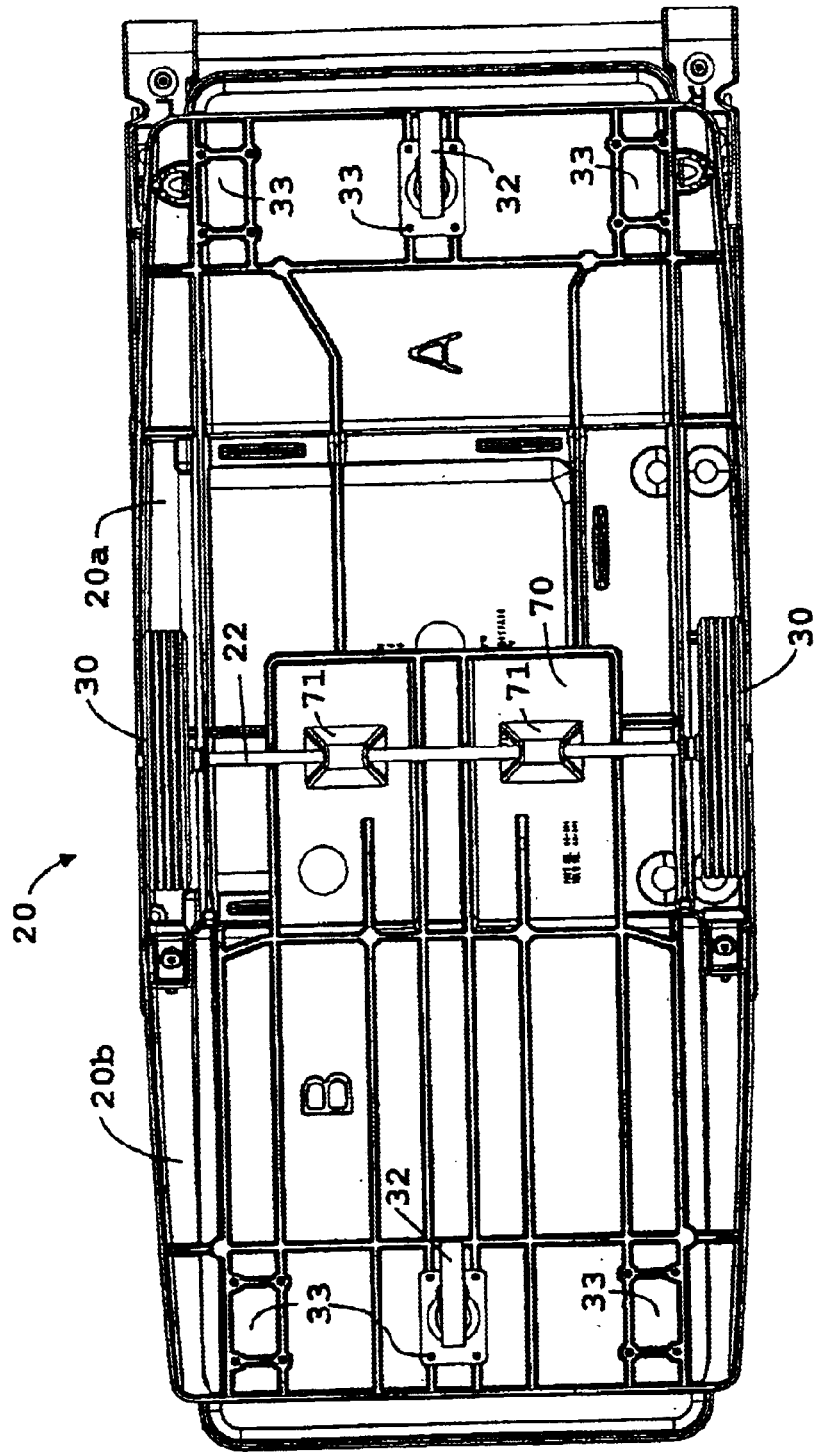
FIG. 7 is a bottom view of the janitorial cart shown in FIG. 1.
Figure 9:
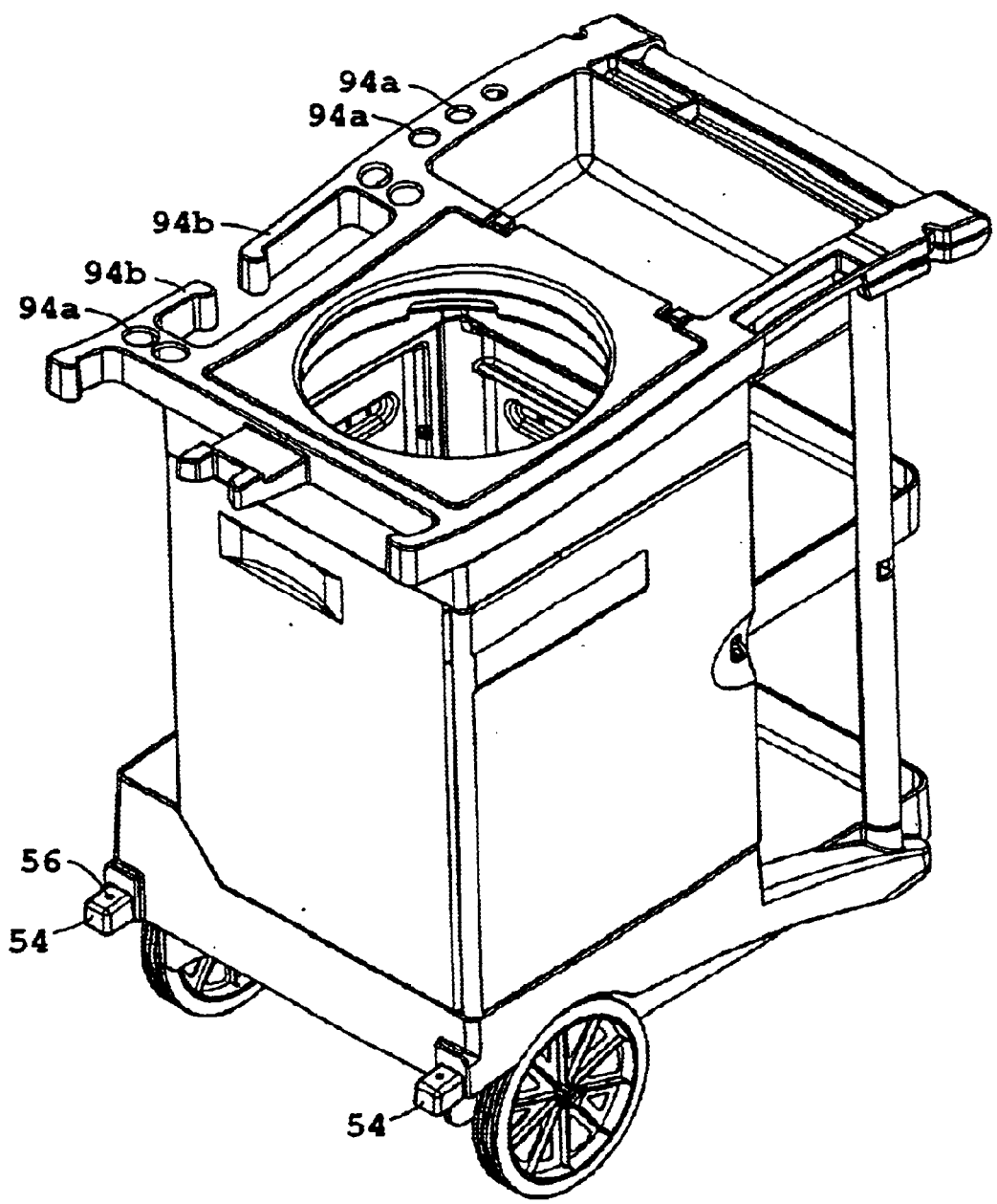
FIG. 9 is a perspective view of a second embodiment of a janitorial cart.
Figure 11:
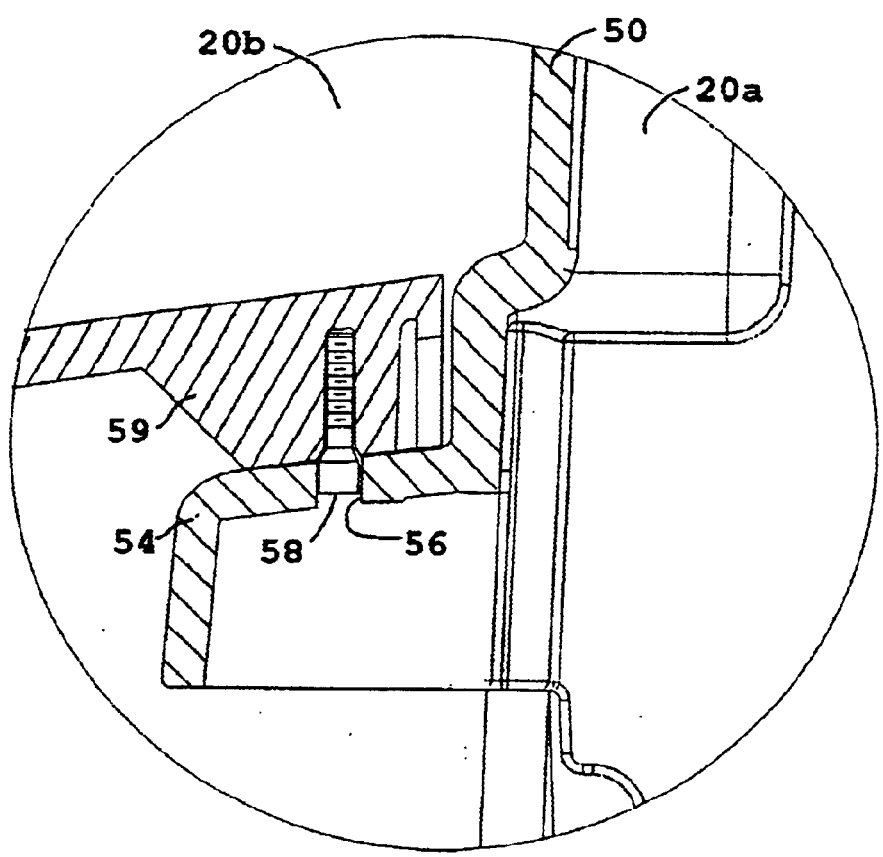
FIG. 11 is partial cross-sectional view illustrating the attachment of the removable front portion of the base to the main portion of the base.
Figure 12:
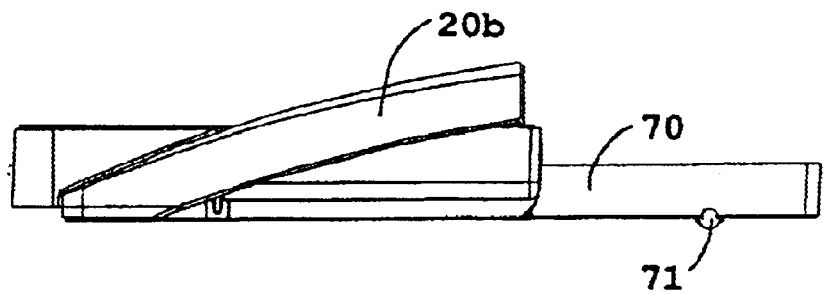
FIG. 12 is a side view of the removable front portion of the base.
Figure 13:
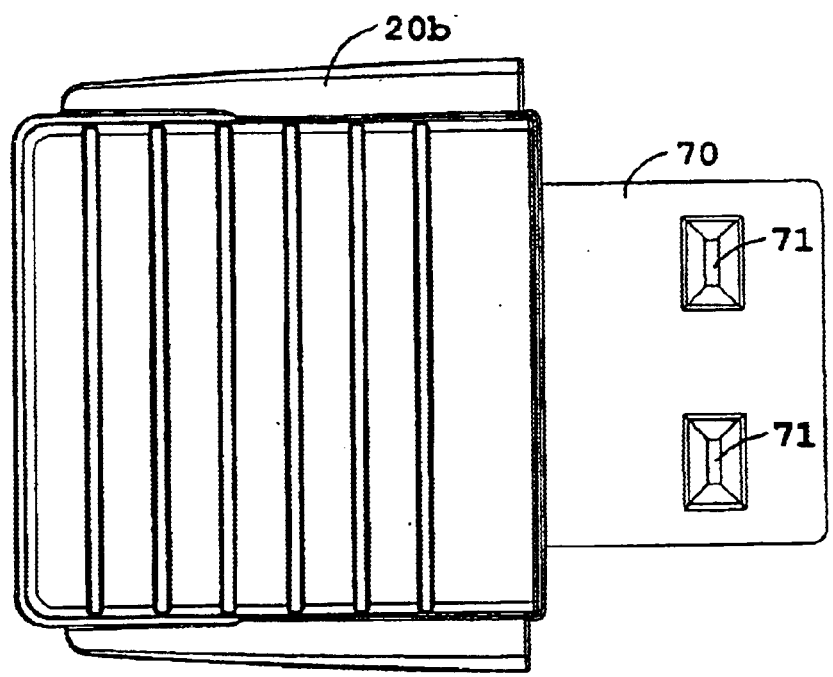
FIG. 13 is a top view of the removable front portion of the base.

The mop bucket tray 24 can be removably attached to the janitorial cart 10. For this removable embodiment of the janitorial cart 10, the base 20 is divided into a central base portion 20a and a removable front portion 20b, as shown in FIG. 5. The removable front portion 20b includes a tray extension 70 (see FIGS. 7, 12 and 13) that fits under the central base portion 20a. The tray extension 70 includes two axle supports 71 through which the central wheel axle 22 is inserted, as shown in FIG. 7. A pair of supports 54 (See FIGS. 9 and 11) are provided in the front portion of the central base portion 20a for securing the removable front portion 20b and the central base portion 20a together. Corresponding attachment supports 59 are provided in the under side of the removable front portion 20b. A threaded screw or bolt 58 is inserted through a screw hole 56 in support 54 and engages a threaded hole (not numbered) in attachment support 59 to secure the removable front portion 20b to the central base portion 20a. An embodiment of janitorial cart 10 without the mop bucket tray 24 is shown in FIG. 9

Figure 2:
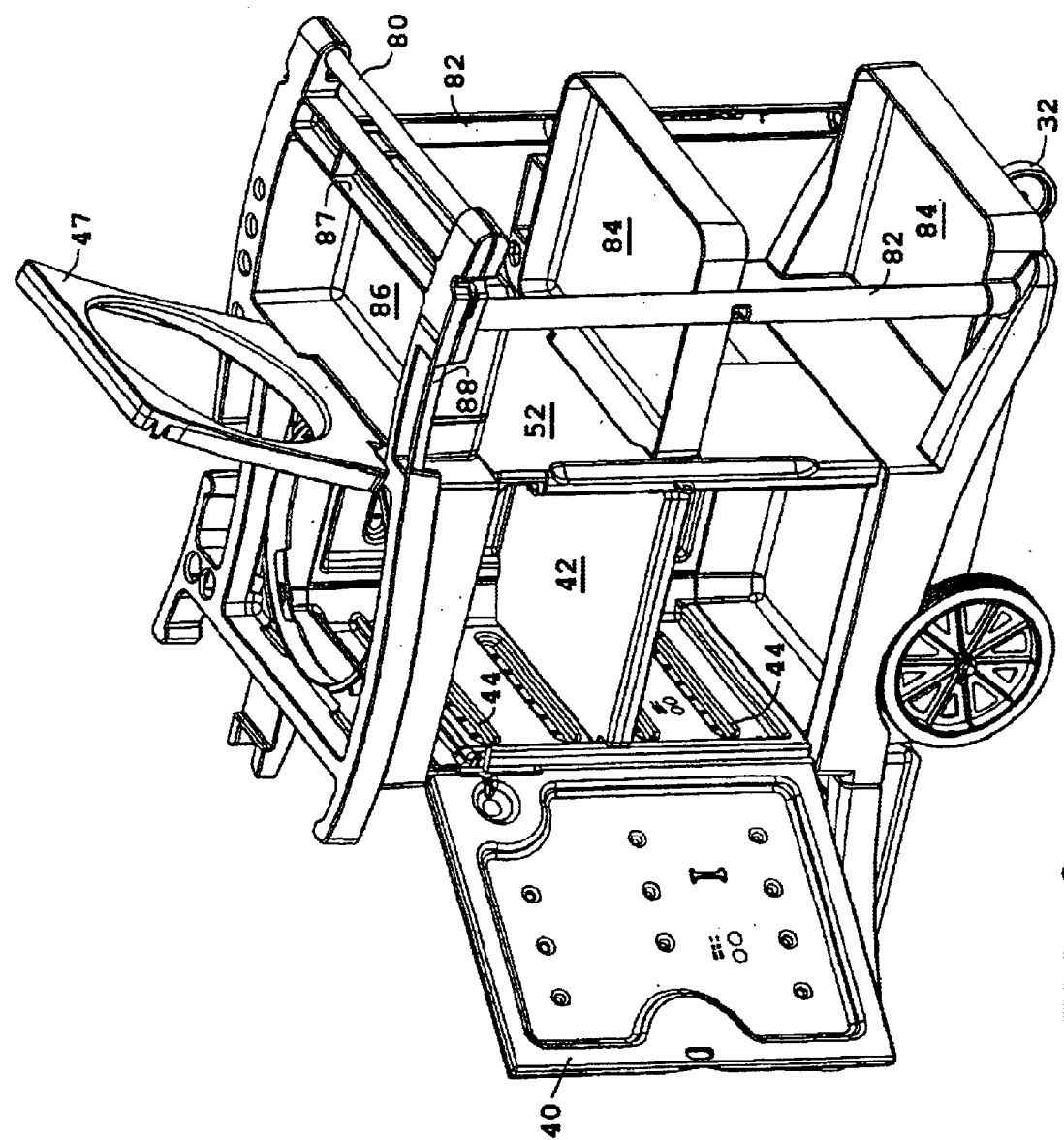
FIG. 2 is a second perspective view of the janitorial cart shown in FIG. 1, illustrating the side door and the lid in an open position.
Figure 3:
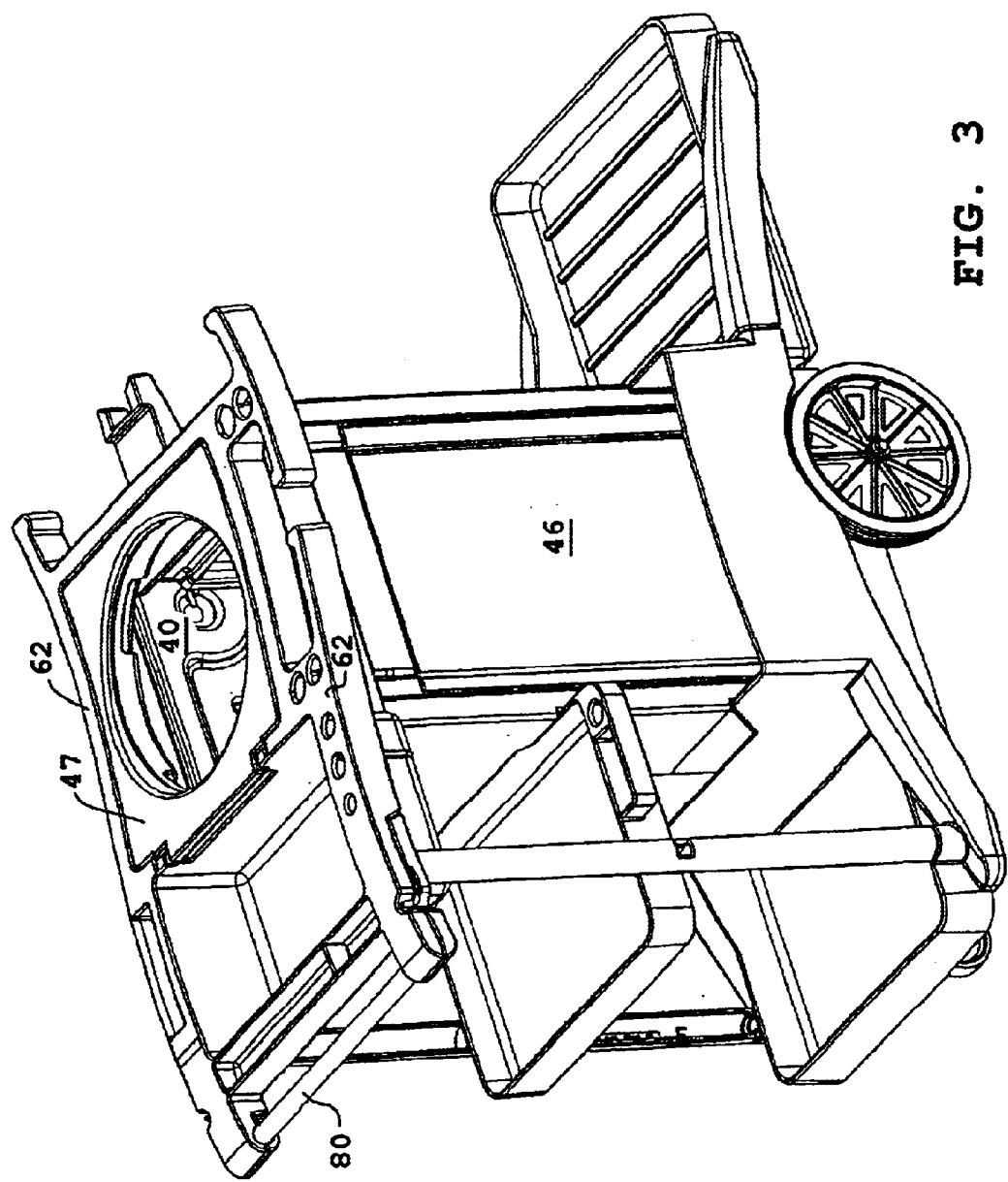
FIG. 3 is a third perspective view of the janitorial cart shown in FIG. 1.
Figure 14:
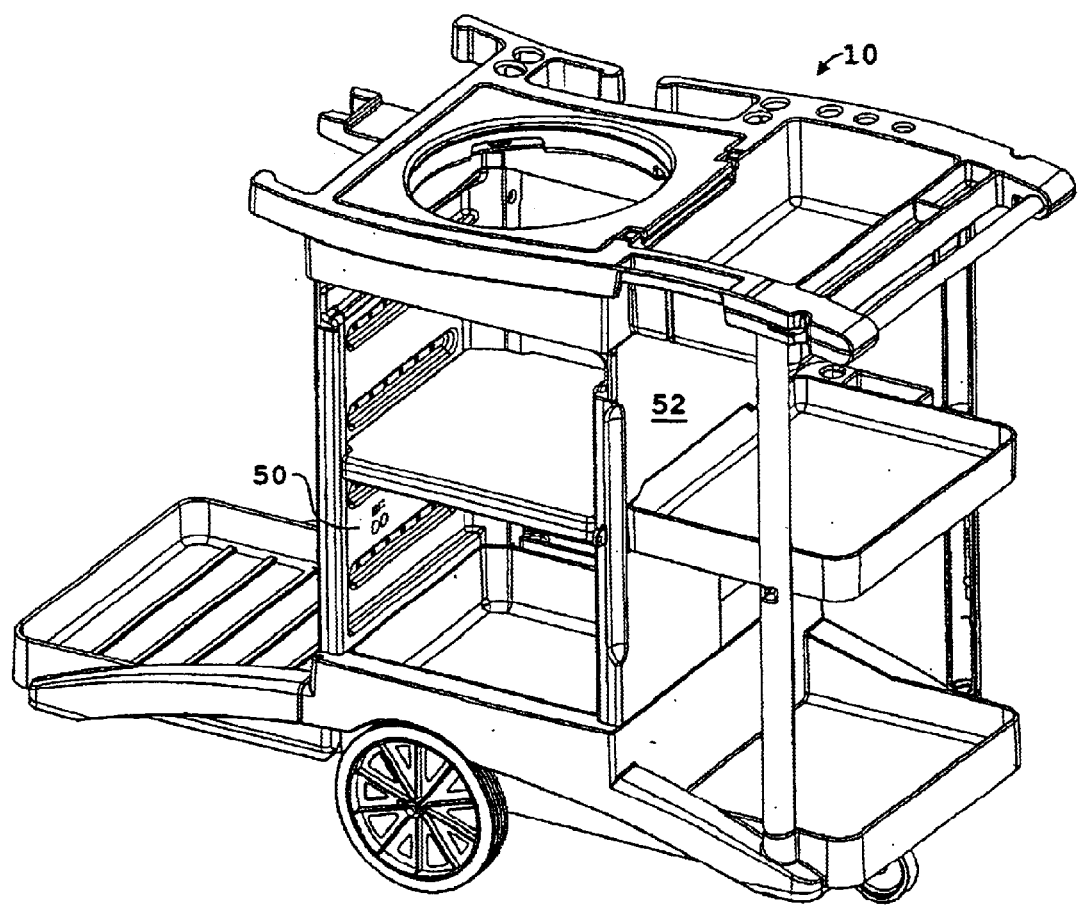
FIG. 14 is a perspective view of a third embodiment of the janitorial cart shown in FIG. 1.

The trash holding compartment 25 is preferably a closed sided compartment as shown in FIG. 2. If desired, the trash compartment 25 could be open sided with no sides or with only a front and rear, as shown in FIG. 14. In the preferred embodiment, trash compartment 25 includes a door 40 forming the right side, a front 50, a rear 52 and a left side 46, all forming the closed sided compartment. A pivotable lid 47 is provided in the top surface 62 of janitorial cart 10. Lid 47 is part of the trash compartment 25 and provides a closure over a raised grip 48 (See FIG. 8) formed around a trash receiving opening 60. Opening 60 is formed in both an upper surface of the trash compartment 25 and the lid 47. With the lid 47 open, a trash bag (not shown) is placed into the trash compartment, usually through opening 60. The open end of the bag is gathered about the outside of raised grip 48 and an elastic cord 49 (See FIG. 8) is then placed about the trash bag to secure the trash bag to the raised grip 48. If desired, door 40 can be opened and the trash bag inserted into trash compartment 25 and up through opening 60. After securing the trash bag to the raised grip 48, the lid 47 is closed.

Figure 8:
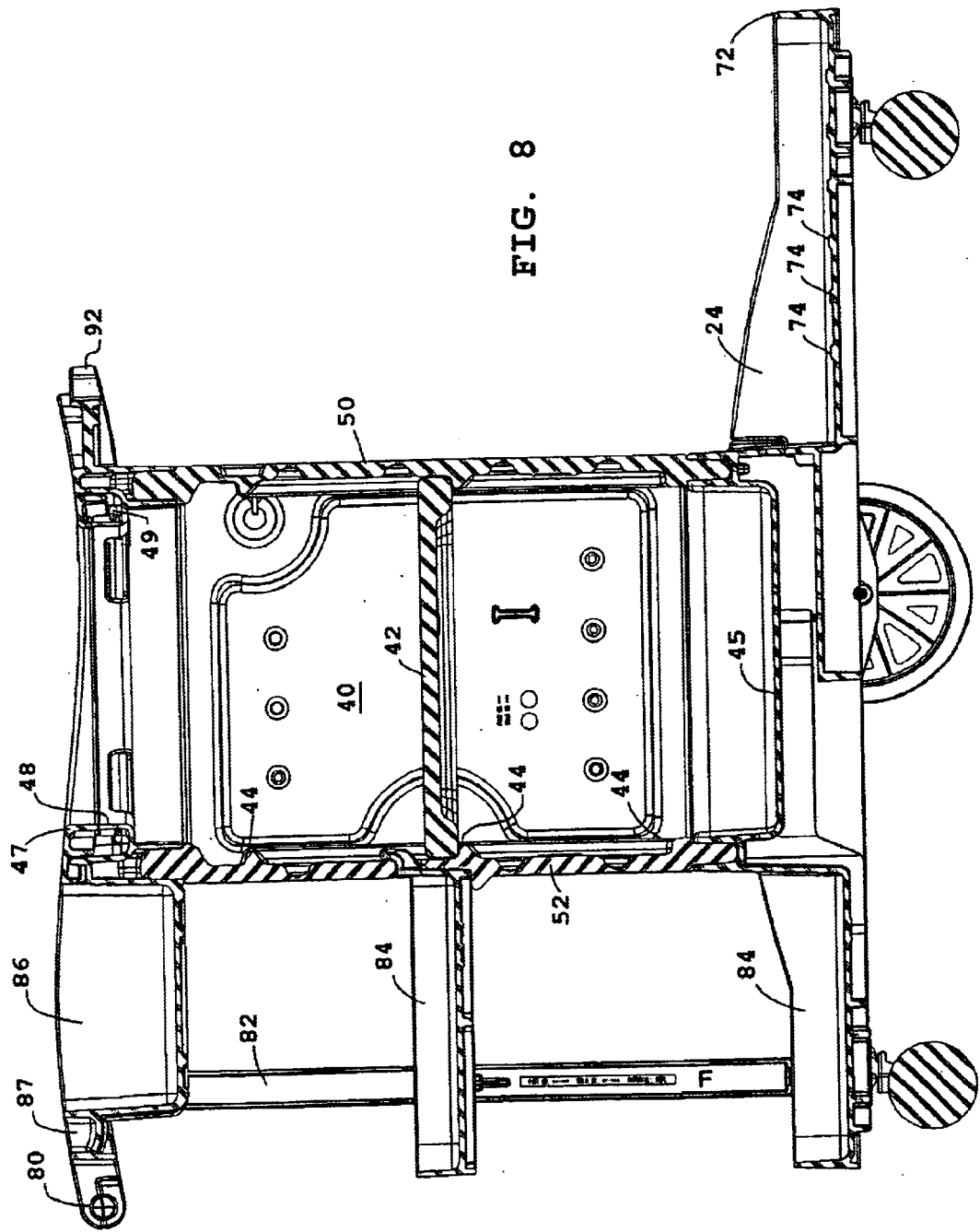
FIG. 8 is a cross-sectional view taken on line 8—8 of FIG. 6.

The interior of trash compartment includes a plurality of shelf supports 44 and one or more removable shelves 42. When desired, a shelf 42 can be used as a trash bag support shelf. For larger trash bags, shelf 42 is placed in a middle height position, as shown in FIGS. 2 and 8. For smaller trash bags, shelf 42 can be placed on the upper shelve support 44. If more interior or concealed storage space is desired, shelf 42 can be used in the upper position to provide more storage below the trash bag. Shelf 42 also acts to separate the trash bag from any items stored within trash compartment 25. The bottom 45 of trash compartment 25 can also be used as a storage surface. For very large items or to use the trash compartment 25 with a removable rigid waste container, all shelves 42 are removed and the large items are placed directly on bottom 45.

The goods storage zone or compartment 28 is preferably an open sided compartment formed with a plurality of storage trays 84 and deep upper storage tray 86 with attached small items storage 87, attached to support side posts 82 and trash compartment 25. A separate handle 80 is attached to the upper surface 62 of the cart. This handle is separate from and distal from the trash compartment 25. Fold out hooks 90 are placed in both sides of the goods storage compartment 28. When needed, hooks 90 are rotated outward from a recessed position, shown in the FIGURES to an extended position (not shown) to hold small items, such as towels, dust pans, small spray bottles, etc. A towel rack 88 is provided in one side of the goods storage compartment 28. Towel rack 88 can also be used for spray bottles or any other small items that can be "hooked" over the rack 88.

A plurality of tool holders 94a, 94b are provided in the top surface 62 of the goods storage compartment 28 and the trash compartment 25. Some of the tool holders 94a are circular through apertures 94a formed in top surface 62. Tool holders 94a can be used for small tools, brushes, etc. Other tool holders consist of arm extension 94b, which can be used with long handled items such as brooms, dry mops, etc. Preferably, some of the arm extensions 94b are positioned over a side pocket 76 that is along side the left side 46 of the trash compartment 25. Side pocket 76 holds dirty items such a the bristle end of a broom or a mop to prevent dirt on those items from spreading to other areas of janitorial cart 10.

Figure 10:
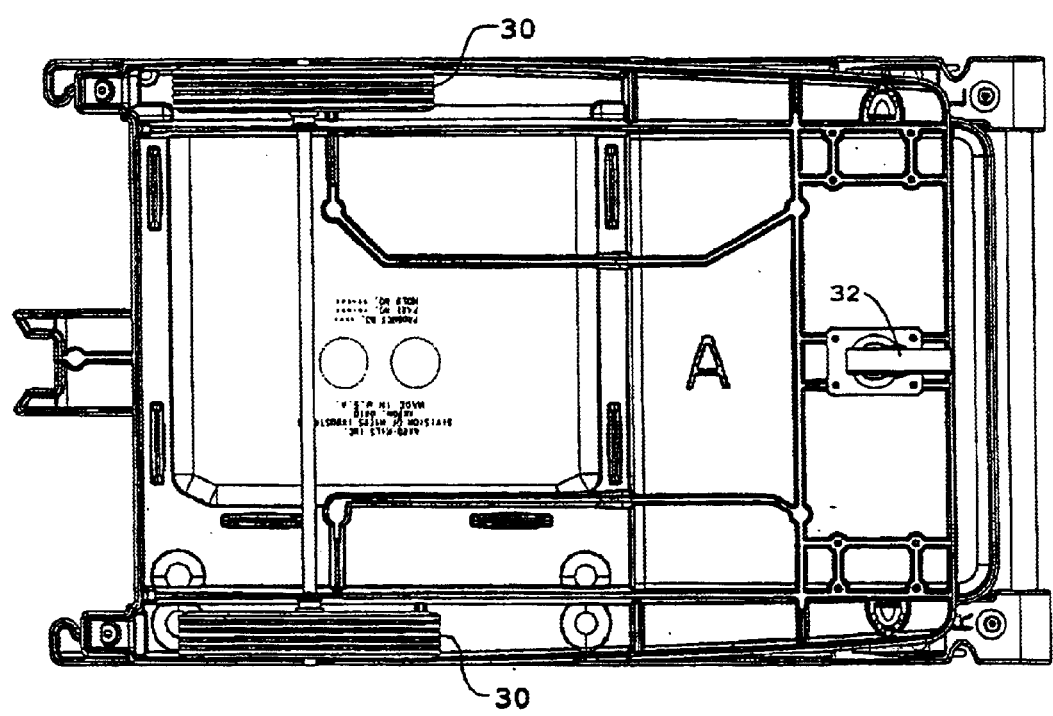
FIG. 10 is a bottom view of the second embodiment of the janitorial cart shown in FIG. 9.

As shown in FIG. 7, the bottom of base 20 has a plurality of wheel attachments 33. The number of wheel attachments 33 is preferably greater than the number of outboard wheels 32. In the embodiments shown in the FIGURES, either two outboard wheels 32 are used and in combination with the central wheels 30 are placed in a diamond pattern, shown in FIG. 7, or a single outboard wheel 32 is used and in combination with the central wheels is placed in a triangular pattern, as shown in FIG. 10. Preferably, four outboard wheels are attached to base 20 using the wheel attachments 33 adjacent the outer corners of base 20. Outboard wheels 32 are swivel wheels that include a swivel bearings and are attached to a flange that can be screwed or bolted to wheel attachments.

Having described the invention, what is claimed is:

1. A manually propelled janitorial cart comprising:
   a base;
   a pair of central wheels attached to the base;
   four outboard wheels attached to the base;
   a trash holding compartment attached to the base and positioned over an axis extending through the pair of central wheels and being positioned over a central portion of the base, the trash holding compartment having an upper top surface with a trash receiving aperture therein; and
   two outboard compartments positioned adjacent the trash holding compartment, each outboard compartment being positioned over two outboard wheels,
   wherein a front portion of the base is removably attached to a central portion of the base, the removable front portion of the base forming one of the outboard compartments, the remaining portion of the base forming a functional cart having four wheels attached thereto.

2. The manually propelled janitorial cart according to claim 1, wherein the trash holding compartment is at least partially open sided.

3. The manually propelled janitorial cart according to claim 1, wherein the trash holding compartment is closed on four sides by a plurality of rigid panels.

4. The manually propelled janitorial cart according to claim 3, wherein the rigid panel closed sided trash holding compartment has a door in one side thereof.

5. The manually propelled janitorial cart according to claim 1, wherein the central wheels have a diameter larger than the outboard wheels.

6. The manually propelled janitorial cart according to claim 1, further comprising;
   a separate handle attached to one of the outboard compartments, said one of the outboard compartments being between the handle and the trash holding compartment.

7. A manually propelled janitorial cart comprising:
   a base;
   a plurality of wheels attached to the base; and
   a plurality of laterally spaced zone separation compartments attached to the base, a first zone separation compartment being a goods storage compartment, a second zone compartment being a wet zone compartment, and a third zone separation zone being a trash holding compartment, the trash holding compartment being between the goods storage compartment and the wet zone compartment,
   wherein the wet zone compartment and a corresponding portion of the base are removably attached to a central portion of the base, the remaining portion of the base forming a functional cart having four wheels attached thereto.

8. The manually propelled janitorial cart according to claim 7, further comprising:
   a vertically extending barrier between adjacent zone separation compartments, the barrier being a rigid panel having a height substantially the same as a height of the trash holding compartment and a width substantially the same as a width of the goods storage compartment.

9. The manually propelled janitorial cart according to claim 7, further comprising:
   a side pocket attached to the base alongside the trash holding compartment.

10. The manually propelled janitorial cart according to claim 7, further comprising:
    a plurality of tool holders formed in a top surface of at least one of the trash holding compartment and the goods storage compartment.

11. The manually propelled janitorial cart according to claim 7, wherein the wet zone compartment includes a water retaining curb.

12. The manually propelled janitorial cart according to claim 11, wherein the wet zone compartment further includes a plurality of ridges formed in an upper surface thereof.

13. The manually propelled janitorial cart according to claim 7, further comprising;
    a handle attached to the goods storage compartment and being spaced outward from the goods storage compartment forming a gap between the goods storage compartment and the handle.

14. The manually propelled janitorial cart according to claim 7, wherein the trash holding compartment is closed sided by a plurality of rigid panels, the goods storage compartment has an open framework supporting at least one shelf, and the wet zone compartment has a curb attached to the base.

15. A manually propelled janitorial cart comprising:
    a base;
    a plurality of wheels attached to the base; and
    a plurality of laterally spaced zone separation compartments attached to the base, a first zone separation compartment being a goods storage compartment, a second zone compartment being a wet zone compartment, and a third zone separation zone being a trash holding compartment, the trash holding compartment being between the goods storage compartment and the wet zone compartment,
    wherein a front portion of the base is removably attached to a central portion of the base, the remaining portion of the base forming a functional cart having four wheels attached thereto.

16. The manually propelled janitorial cart according to claim 15, wherein the removable front portion of the base includes a curb.

17. The manually propelled janitorial cart according to claim 15, further comprising:
    a vertically extending barrier between adjacent zone separation compartments, the barrier being a rigid panel having a height substantially the same as a height of the trash holding compartment and a width substantially the same as a width of the goods storage compartment.

18. The manually propelled janitorial cart according to claim 15, further comprising:
    a side pocket attached to the base alongside the trash holding compartment.

19. The manually propelled janitorial cart according to claim 15, further comprising:
    a plurality of tool holders formed in a top surface of at least one of the trash holding compartment and the goods storage compartment.

20. The manually propelled janitorial cart according to claim 15, wherein the wet zone compartment includes a water retaining curb.

21. The manually propelled janitorial cart according to claims 20, wherein the wet zone compartment further includes a plurality of ridges formed in an upper surface thereof.

22. The manually propelled janitorial cart according to claim 15, further comprising;
    a handle attached to the goods storage compartment and being spaced outward from the goods storage compartment forming a gap between the goods storage compartment and the handle.

23. The manually propelled janitorial cart according to claim 15, wherein the trash holding compartment is closed sided by a plurality of rigid panels, the goods storage compartment has an open framework supporting at least one shelf, and the wet zone compartment has a curb attached to the base.

24. A manually propelled janitorial cart comprising:
    a base;
    a pair of central wheels attached to the base;
    four outboard wheels attached to the base;
    a central compartment attached to the base and positioned over an axis extending through the pair of central wheels; and
    two outboard compartments positioned adjacent the central compartment, each outboard compartment being positioned over two outboard wheels,
    a front portion of the base being removably attached to a central portion of the base, the removable front portion of the base forming one of the outboard compartments, the remaining portion of the base forming a functional cart having four wheels attached thereto.

25. A manually propelled janitorial cart comprising:
    a base;
    a pair of central wheels attached to the base;

four outboard wheels attached to the base;

a central compartment attached to the base and positioned over an axis extending through the pair of central wheels; and two outboard compartments positioned adjacent the central compartment, each outboard compartment being positioned over two outboard wheels, a front portion of the base being removably attached to a central portion of the base, the removable front portion of the base forming one of the outboard compartments, the remaining portion of the base forming a functional cart having four wheels attached thereto, wherein the front portion of the base is attached to the central portion of the base by an axle extending from one central wheel to the other central wheel, the central wheels being attached to the axle.

* * * * *